United States Patent Office 2,865,761
Patented Dec. 23, 1958

2,865,761
DIETARY GEL COMPOSITION

Herbert Thal Leo and Clarence C. Taylor,
Anaheim, Calif.

No Drawing. Application January 2, 1957
Serial No. 632,017

5 Claims. (Cl. 99—132)

This invention relates to an artificial sweetening composition and to gels made therefrom. More particularly the invention relates to an artificial sweetening composition having substantially no caloric value and substantially free from sodium compounds, adapted to be used with a minimum methoxyl pectinic acid in the making of sugar-free calcium-type gels.

In the preparation of sugar-free calcium-type gels of a dietary nature in accordance with the present invention, we use the minimum methoxyl pectinic acid described and claimed in our Patent No. 2,801,178, filed as a continuation-in-part of our now abandoned application Serial No. 485,579, filed February 1, 1955. Such a minimum methoxyl pectinic acid is obtained from high methoxyl pectin produced from citrus peel, either with or without isolation of the pectin in a dry, substantially pure form, by the action on such pectin of an enzyme, termed pectase, also derived from citrus peel. If the enzymic action is allowed to go to completion, as described in the aforesaid application, a minimum methoxyl pectinic acid is obtained that is capable of forming gels, either in the presence or absence of sugar, by an adjustment of the pH of the aqueous solution of such minimum methoxyl pectinic acid to a value within the range of between 2.75 and 4.50, depending upon the total solids content of the aqueous solution or dispersion. In addition, our minimum methoxyl pectinic acid is capable of forming gels with bivalent metals, such as calcium and magnesium, in the absence of sugar, provided the pH is at about 4, and preferably not above about 5.

Our present invention takes advantage of the ability of our minimum methoxyl pectinic acid to form calcium gels and the like in the absence of sugar, and combines with such minimum methoxyl pectinic acid an artificial sweetening composition capable of providing sufficient calcium ions to cause the formation of a calcium jelly even in the absence of calcium ions from other sources. At the same time, our artificial sweetening composition imparts to the gel so formed an adequate degree of sweetening, such that no sugar need be used. The substantial absence of sodium from the artificial sweetening composition makes it of value in cases where the sodium content of the diet should be as low as possible.

It is therefore an object of the present invention to provide an artificial sweetening composition for use in substantially sodium-free diets and in those diets where sugar should be kept to a minimum because of diabetic or low-caloric requirements.

It is a further important object of this invention to provide a composition for use in making dietetic gels and the like of low sodium and sugar content but of good texture and pleasing palatability.

Other and further important objects of this invention will become apparent from the following description and appended claims.

In the preparation of our artificial sweetening agent, we employ calcium cyclamate or a mixture of calcium cyclamate and calcium saccharin. Calcium cyclamate is the calcium salt of cyclohexane sulfamic acid, having a molecular weight of about 433 and a calcium content of about 10% by weight. Calcium saccharin is the calcium salt of 2,3-dihydro-3-oxo-benzisosulfonazole, having a molecular weight of around 516 and a calcium content of about 8% by weight. The composition of our artificial sweetener may be as follows:

|  | Preferred Ranges, percent | Broad Range, percent |
|---|---|---|
| Calcium Cyclamate | 8 or 9 | 5 to 10 |
| Calcium Saccharin | 2 or 1 | 5 to 0 |

In addition to the sweetening compounds, themselves, the composition may include about 0.10% of benzoate of soda and 0.005% of methyl parabenzoic acid for preservative purposes. For instance, in making up one liter of an aqueous solution of the sweetening composition, the preferred proportions are the following:

80 grams of calcium cyclamate
20 grams of calcium saccharin
½ gram of methyl parabenzoic acid
1 gram of benzoate of soda An aqueous sweetening agent having the above composition has general utility as a substitute for sugar. For use in the household, the aqueous solution is conveniently put up in "squeeze" bottles for dispensing therefrom as needed.

In the making of gels, using the sweetening composition of our invention, we prefer to have the minimum methoxyl pectinic acid also in the form of an aqueous solution, or dispersion. A satisfactory composition of minimum methoxyl pectinic acid in dry form for making into such a solution, or dispersion, is the following:

|  | Parts by weight |
|---|---|
| Minimum methoxyl pectinic acid | 10 |
| Potassium citrate | 8.5 |
| Sodium hexametaphosphate | 6.5 |
| Dextrose | 75 |
|  | 100.0 |

In place of potassium citrate, sodium citrate or other alkali metal salt of an edible oxy-organic acid may be used, but potassium citrate is preferred where a minimum sodium content in the composition is desired. The potassium citrate serves both as a solubilizing and as a buffer agent for the minimum methoxyl pectinic acid composition. The sodium hexametaphosphate acts as a calcium sequestering agent to eliminate any possibility of gel formation in the standard aqueous solution of the minimum methoxyl pectinic acid if it were made up with a hard water, or one containing calcium or magnesium. Other compositions of the aqueous minimum methoxyl pectinic acid solution may be used in accordance with the disclosures made in the aforesaid pending application.

Our "standard liquid pectin" is prepared by dissolving 6 oz. (170 grams) of the foregoing minimum methoxyl pectinic acid composition in 36 fluid oz. of tap water to make 40 fluid oz. (1200 cc.) of solution. This solution has a pH of about 5.10. Two fluid oz. (60 grams) of the standard liquid pectin contain 0.852 gram of minimum methoxyl pectin.

The following example will serve to illustrate a method of preparing a sugar-free, acid-type gel, using our standard liquid pectin (minimum methoxyl pectinic acid solution) and the artificial sweetening solution described above:

Example I

The following ingredients are mixed together:
1 cup of fruit juice (unsweetened)
2 teaspoonsful of the artifical sweetening solution
1 cup of standard liquid pectin
½ cup of lemon juice Upon mixing the above listed ingredients, the mass is heated to about 130° F. to put the ingredients into solution and is then poured into a container and cooled to room temperature, whereupon gelling occurs. The pH is about 3.4, and the gel is an acid-type gel. Since the gel so produced has never been sterilized, it should be kept in a refrigerator if it is not to be used immediately. The gel has a melting point of about 110° F., and resembles a gelatin type jelly, or dessert. A one-half (½) cup serving has a value of 40 calories.

The following is an example of a low sugar gel:

Example II 1 cup of fruit juice (unsweetened)
½ cup sugar
1 cup standard liquid pectin solution
½ cup lemon juice As before, the above ingredients are mixed, heated to 130° F., and allowed to cool, whereupon gelling occurs. The gel has a pH of about 3.4 and a one-half (½) cup serving has a caloric value of 100. The melting point is above 110° F.

While the gel of Example II contains sugar and is therefore not a diabetic gel, it nevertheless has a sufficiently low sugar content to be useful in a calorie-controlled diets. From the standpoint of texture and palatability substantially no difference can be detected between the gels of Examples I and II.

It is also possible to prepare a calcium-type gel merely by the use of our artificial sweeting composition and our minimum methoxyl pectinic acid solution, without any other ingredients than water. This may be termed a calcium test for our standard liquid pectin, and is carried out by mixing the following ingredients:

Example III 8 fluid oz. of tap water
1 teaspoonful of our artificial sweeting solution
2 fluid oz. of our standard liquid pectin
Q. s lemon juice to give a pH of about 4.00 (between 3.85 and 4.50)

In the formation of a gel from the ingredients just given in Example III, the amount of calcium supplied by the artificial sweetening solution is sufficient to form a calcium gel with our minimum methoxyl pectinic acid. One teaspoonful (5 cc.) of the artificial sweetening solution is equivalent to about 50 mg. of calcium and that is more than sufficient to effect the formation of a gel with the amount of minimum methoxyl pectinic acid present, which is equivalent to about 1 gram (0.852 gram) dry weight. Thus, pure water gels of the calcium type can be prepared from our minimum methoxyl pectinic acid, using our artificial sweetening solution, even where no calcium is furnished by other ingredients.

In our artificial sweetening solution, made up as described hereinabove by dissolving 80 grams of calcium cyclamate and 20 grams of calcium saccharin and making up to 1 liter, the concentration is 10% by weight of the calcium compounds and, hence, the calcium content is approximately 1% by weight of said solution. Since 50 mg. of calcium is sufficient to form a calcium gel with 1 gram of our minimum methoxyl pectinic acid, and since calcium cyclamate contains about 10% by weight of calcium, it follows that 0.5 gram of calcium cyclamate will furnish sufficient calcium to effect a gel with from 0.5 to 1 gram of such pectinic acid furnished by our standard pectin solution. The gel mass might, then, have the following composition:

300 parts water (supplied by the 8 fluid oz. tap water + 2 fluid oz. standard pectin solution)
0.5—1.00 part minimum methoxyl pectinic acid
0.85 part potassium citrate
0.65 part sodium hexametaphosphate
0.05 part sweetening agent Instead of calcium cyclamate alone, the sweetening composition may comprise 8 or 9 parts of calcium cyclamate and 2 or 1 parts of calcium saccharin, respectively, without substantially altering the amount of calcium furnished by the composition.

Other calcium-type gels can be prepared, with substantially no calories, no sugar and no sodium present, by the use of our artificial sweetening composition, our standard liquid pectin and water packed fruit. The water packed fruit is available in 16 oz. cans, or, if sugar is unobjectionable, a fruit packed with sugar may be used. Our artificial sweetening composition supplies sufficient calcium ions in one teaspoonful (5 cc.) to gel one pound of fruit, either water packed or with sugar, when using ¼ cup of our standard liquid pectin. The following examples will serve to illustrate this method of preparing calcium-type gels:

Example IV 16 oz. (avoirdupois) of fruit and juice
1 teaspoonful (5 cc.) 10% calcium cyclamate solution
¼ cup (2 fluid oz.) of our standard liquid pectin The above ingredients are simply stirred together and allowed to set.

Example V 16 oz. (avoirdupois) of fruit and juice
1 teaspoonful of our artificial sweetener (9% calcium cyclamate–1% calcium saccharin)
¼ cup of our standard liquid pectin

Example VI 16 oz. (avoirdupois) of fruit and juice
1 teaspoonful (5 cc.) of our artificial sweetening composition (8% calcium cyclamate–2% calcium saccharin)
¼ cup (2 fluid oz.) of our standard liquid pectin In each of Examples IV through VI, the artificial sweetening composition, whether made up of a 10% solution of calcium cyclamate alone, as in Example IV, or of 9% calcium cyclamate and 1% calcium saccharin, as in Example V, or of 8% calcium cyclamate and 2% calcium saccharin, as in Example VI, furnishes 50 mg. of calcium, and this is sufficient calcium to effect a calcium-type gel with 16 oz. (avoirdupois) of fruit and water, in a total mass weighing about 500 grams. Using this same ratio, 10 mg. of calcium is capable of effecting the gelling of 100 grams of an aqueous fruit mass.

The gelling effect of the calcium supplied by our artificial sweetening composition is, of course, controlled by the sodium hexametaphosphate content, as a calcium sequestering agent, and the potassium or sodium citrate content, as the buffering and solubilizing agent, in our standard liquid pectin solution. Using the compositions and proportions set forth in Examples IV through VI, firm gels, free from syneresis, are produced, without ever heating the masses above room temperature and at pH's of between 3.85 and 4.50 with no sugar present. These gels are similar to gelatin jellies in that they can be softened or even liquified upon the application of heat and will reform or re-set, upon cooling. The temperature at which the gels are reversible is generally around 110° F., so that they need not be refrigerated except for protection against the gels spoiling due to attack by molds or fungi.

The fact that the sodium hexametaphosphate and the potassium sodium citrate in the standard liquid pectin controls the action of the calcium furnished by the artificial sweetening composition is easily demonstrated. If, instead of using ¼ cup of liquid pectin, as in Examples IV through VI, ⅛ of a cup of liquid pectin is used, the gel will hardly mold, and if ½ cup of standard liquid pectin is used, the mass remains a thin fluid or very soft gel. This indicates that there must be sufficient calcium present, as furnished by the artificial sweetening composition, to effect a gel of the minimum methoxyl pectinic acid in the presence of the sodium hexametaphosphate and potassium or sodium citrate, and that this proportion of calcium to minimum methoxyl pectin, to form a calcium-type gel in the absence of sugar, should be about 50 mg. of calcium for about 1 gram (0.852 gram) of minimum methoxyl pectinic acid, dry weight.

It will be understood that modifications and variations may be effected without departing from the scope of the novel concepts of the present invention.

We claim as our invention:

1. A dietary calcium-type gel composition comprising a minimum methoxyl pectinic acid, a sufficient quantity of a substantially sodium-free artificial sweetening agent selected from the group consisting of calcium cyclamate and mixtures of calcium cyclamate and calcium seccharin to furnish at least about 50 mg. of calcium per 1 gram of said pectinic acid, a sufficient amount of acid and of an alkili metal salt of an edible oxy-organic acid to give the final aqueous gel a pH of between about 3.85 and 4.50 and a sufficient amount of sodium hexametaphosphate in combination with said oxy-organic acid salt to effect the dissolution in water of said pectinic acid in the presence of the amount of said calcium furnished solely by said sweetening agent within the pH range stated when at an elevated temperature but insufficient to prevent formation of a final aqueous gel at a lower temperature of set.

2. A dietary gel composition as defined by claim 1, in which the artificial sweetening agent consists of about 4 parts of calcium cyclamate and 1 part of calcium saccharin.

3. A dietary gel composition as defined by claim 1, in which the acid furnished by lemon juice is citric acid and the alkali metal salt of an edible oxy-organic acid is potassium citrate.

4. A dietary gel composition as defined by claim 1, in which the artificial sweetening agent consists of about 4 parts of calcium cyclamate and 1 part of calcium saccharin, the acid furnished by lemon juice is citric acid, the alkali metal salt of an edible organic acid is potassium citrate and the amount of water is from 300 to 600 times the weight of said minimum methoxyl pectinic acid in said final aqueous gel.

5. A dietary aqueous gel as defined by claim 4 that is substantially free from sugar and that is in the form of a firm gel, free from syneresis and that has a temperature of set of about 110° F.

References Cited in the file of this patent

UNITED STATES PATENTS

| | | |
|---|---|---|
| 2,536,970 | Weast | Jan. 2, 1951 |
| 2,629,665 | Gordon | Feb. 24, 1953 |
| 2,701,767 | Twieg et al. | Feb. 8, 1955 |
| 2,784,099 | Block et al. | Mar. 5, 1957 |
| 2,803,551 | Helgren | Aug. 20, 1957 |